United States Patent [19]
Ritchie

[11] Patent Number: 5,797,601
[45] Date of Patent: Aug. 25, 1998

[54] USER SELECTIVE SOLUTION SYSTEM AND METHOD FOR FLASHCARDS, PUZZLES, AND THE LIKE

[76] Inventor: William A. Ritchie, 703 Timberbranch Dr., Alexandria, Va. 22302

[21] Appl. No.: 683,201

[22] Filed: Jul. 18, 1996

[51] Int. Cl.⁶ .................................. A63F 9/18; G09B 3/02
[52] U.S. Cl. .................. 273/431; 273/432; 434/347; 434/348
[58] Field of Search ...................... 273/429, 430, 273/431, 432; 434/331, 347, 348

[56] References Cited

U.S. PATENT DOCUMENTS

| | | | |
|---|---|---|---|
| 1,385,623 | 7/1921 | Kellogg | 434/347 |
| 4,731,027 | 3/1988 | Phinney | 434/348 |
| 4,964,642 | 10/1990 | Kamille | 434/348 X |
| 5,094,465 | 3/1992 | Dawson | 273/429 |
| 5,193,818 | 3/1993 | Leeson | 273/340 X |

FOREIGN PATENT DOCUMENTS 254597  2/1963  Australia ........................ 434/347

*Primary Examiner*—William H. Grieb
*Attorney, Agent, or Firm*—Cahn & Samuels LLP

[57] ABSTRACT

A flashcard type device and method adapted for education and entertainment for use by one or multiple participants and providing answers or solutions partitioned into a plurality of pre-defined discrete segments for providing the user with the option of selecting one or more of selected progressive hints or steps to the proper solution.

15 Claims, 1 Drawing Sheet

USER SELECTIVE SOLUTION SYSTEM AND METHOD FOR FLASHCARDS, PUZZLES, AND THE LIKE

TECHNICAL FIELD

This invention concerns a novel flashcard type problem and solution presentation system. More particularly, the invention provides a segmented answer system. The segmented arrangement of the solution contemplates progressive stages or degrees of help. Thus, the invention permits the user to exercise selectivity and self-determination in revealing the quantum of suggestions or help required to solve the problem or puzzle presented by the flashcard.

BACKGROUND OF THE INVENTION

Problem, puzzle, and riddle containing flashcards are familiar devices in the educational and amusement fields. Printed flashcards typically include a problem, such as a word or number problem located on one face, and the corresponding answer printed on the opposite face. Flashcards are established educational tools commonly used in the reading and math fields. Flashcard type games can also be employed to present problems in more esoteric disciplines and provide a tool for promoting social interaction skills.

Typical flashcard type devices present a problem and provide immediate access to the answer. Thus, in the context of a reward system, the user has the means for immediate gratification based on selecting the correct answer. However, where the flashcard presents a difficult problem or a question requiring more sophisticated analysis, providing immediate access to the complete solution or answer can frustrate the user, reduce the entertainment element of the challenge, and/or actually can reduce the user's self-esteem where the user is not able to answer a succession of flashcard problems. Because conventional flashcard structure provides the entire answer to the user once the user decides to consult the answer/solution portion of the card, the user has no choice but to access the answer in its entirety. In essence, the user is compelled to a binary system—an all or nothing answer scheme.

It would be advantageous for a flashcard-type system to provide for a sustained high level of user interest and minimizes frustration of persons whose skill levels are less developed. It would also be an advantage for a flashcard type system to provide positive reinforcement resulting from the successful solving of a problem or puzzle based on an exercise of analytical skills, notwithstanding the reliance on partial help.

SUMMARY OF THE INVENTION

It is an object of this invention to provide a novel flashcard and flashcard solution system combining desirable attributes of the prior art games and overcoming the problems and shortcomings of the prior art.

It is another object of this invention to provide a flashcard device and method permitting user self-selection of progressive suggestions to reach the proper solution where the suggestions are contained in predefined segments.

Still another object of the invention is to provide a novel flashcard answer system permitting active participation by one user or a group of users.

A further object of the invention is to provide a novel flashcard solution system permitting selective disclosure of discrete portions of the answer or solution in a predefined pattern.

It is another object of this invention to provide a flashcard type game readily adapted for print and electronic media.

Yet another object of the invention is to provide flexibility in the degree of difficulty and the degree of selectivity in disclosure of solutions.

These and other objects are satisfied by a method of using a flashcard system employing flashcard providing a question or problem and concealing the answer thereto on the opposing side where the answer or solution is divided into a plurality of discrete answer segments arranged to progressively reveal the correct answer or solution to the problem, the method comprising the steps of:

a) exposing the user with the question contained on the flashcard;

b) providing the user the opportunity to answer the question;

c) allowing the user to select and reveal at least one segment of the plurality of discrete answer segments of the answer to confirm that the user's answer is correct or in error;

d) providing the user with a further opportunity to answer;

e) allowing the user to reveal a select additional portion of the plurality of segments to progressively reveal the answer.

Objects of this invention are also satisfied by a system for presenting a problem and solution, comprising:

a) means for presenting a solvable problem;

b) means for permitting progressive revelation of the solution to the solvable problem, said means comprising a plurality of discrete segments each containing a selected portion of the solution and each being selectively revealable to disclose a corresponding selected discrete segments solution to the problem.

Although the invention is described specifically in reference to flashcards, it contemplates presentation of the flashcard concept in a wide range of media, e.g., printed and electronic. The cards may also include illustrations which visually enhance the presentation or in the case of electronics may include both visual and audio components. Whatever the media, the solution to the problem or puzzle is divided into a plurality of discrete portions where during the process of solving or attempting to solve the problem or puzzle, the user may selectively reveal one or more of a plurality of discrete portions of the solution up to and including the entire answer. The invention is also adaptable for single user or interactive and group use.

Given the following enabling description of the flashcard device and method, the invention herein should become evident to a person of ordinary skill in the art.

BEST MODE FOR CARRYING OUT THE INVENTION

Figure 1:
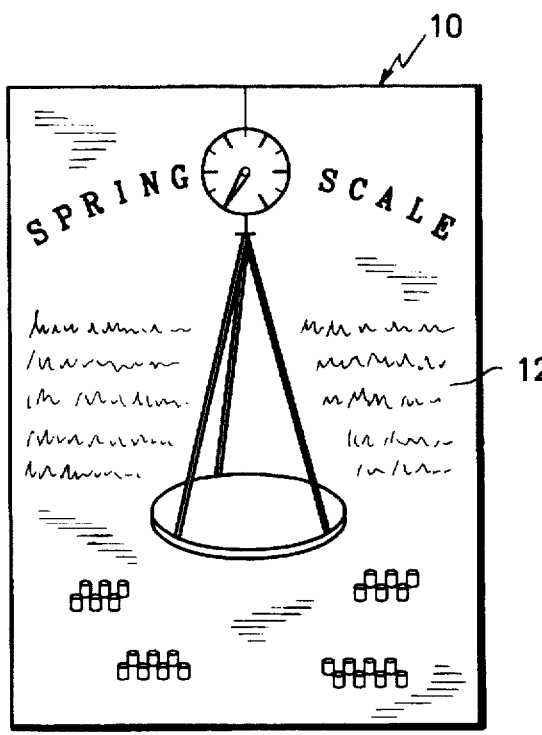
FIG. 1 depicts the front face of a problem containing flashcard according to one embodiment of the invention.
Figure 2:
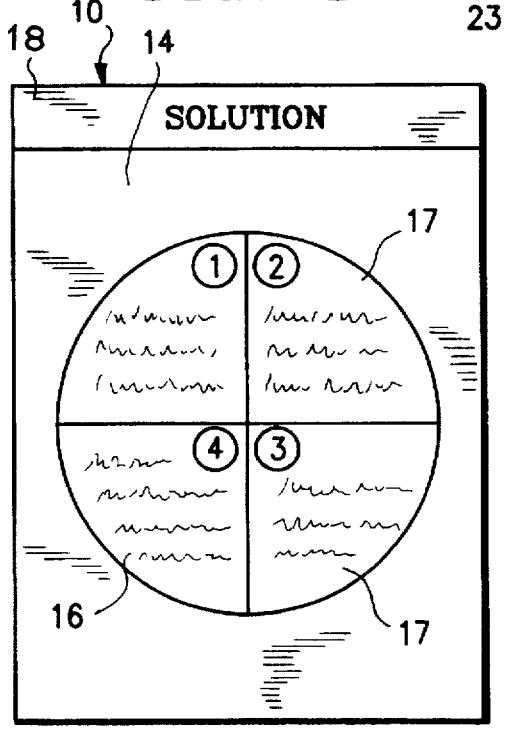
FIG. 2 depicts the opposite face of the flash card embodied in FIG. 1.

In FIGS. 1 and 2, a flashcard 10 according to this invention is depicted. The flashcard 10 includes an indicia bearing front face 12 and indicia containing answer face 14 on the opposite side. The front face 12 presents the question, puzzle, or problem in text form and, as depicted, may be accompanied by a relevant illustration and title. The answer containing face 14, features a segmented solution portion 16 which is divided into a select plurality of discrete self-contained sections 17. The top of the face 14 incorporates a banner identifying that the solution is contained on that face of the card 10. As a matter of convention, it is preferred that the first of the sections 17 to be revealed in the upper left quadrant and the answer wheel is rotated counter-clockwise from that stating point.

Figure 3:
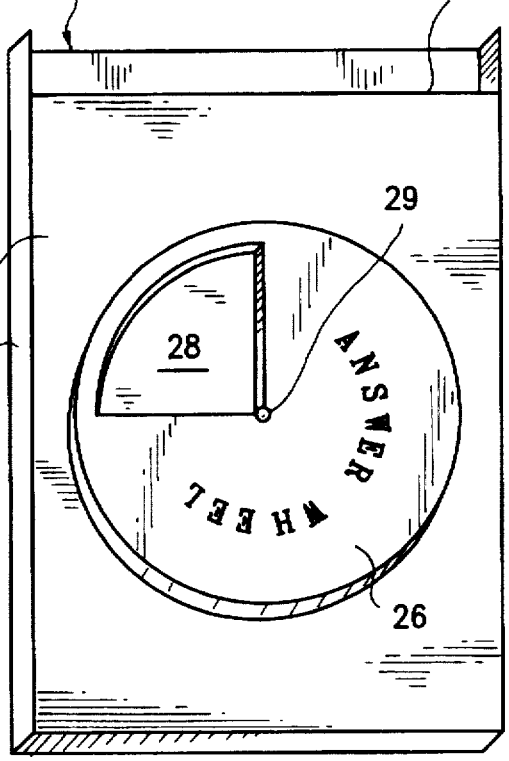
FIG. 3 illustrates a card holder complementarily sized for the flashcard embodiment of FIG. 1.

In FIG. 3, a card holder 20 is depicted. The card holder 20 is defined by a housing 22 that is dimensioned to have a length and a width substantially corresponding to that of the card 10. The housing 22 is three dimensional having sides 23 that have a depth aspect sufficient to accommodate a flashcard 10. The top of the housing 22 is open to form a slot 24 adapted to receive a flashcard 10. The operative face of the housing (illustrated) includes a rotatable wheel 26 having a cutout portion 28 configured similarly to an individual answer segment 17. The wheel 26 is rotatably mounted to the housing 22 by pin 29 which is connected to the housing 22 by an appropriate strut or the like (not illustrated).

The cutout portion 28, when positioned over one of the card answer segments 17, reveals and allows viewing of the underlying segment content. In the illustrated embodiment, the answer portion is divided into four segments. Therefore, to reveal the content of the adjacent answer segment, the wheel must be rotated 90°. The top of the card holder 20 features an open strip dimensioned to generally correspond to the banner 18 on the card 10. Ready reference to the banner provides the user with a simple convention to properly align the card in the holder so the flashcard 10 is properly oriented.

The opposite face of the holder 20 is generally open, or contains an opening of sufficient dimensions to permit viewing of the entire content of the indicia containing face 12.

Figure 4:
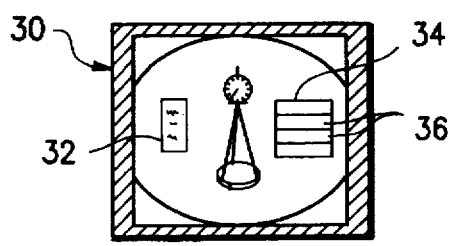
FIG. 4 illustrates a second embodiment of the invention in the form of a computer screen presentation.

FIG. 4 presents a second embodiment of the invention. FIG. 4 represents an electronic visual display 30 (cathode ray tube, liquid crystal, etc.) commonly used to display computer programs, video games, and the like. An electronic version of a card 32 is located on one side of the display and an answer grid 34 is positioned on the other side. The answer grid, like the segment 17, includes discrete answer sections 36 each of which reveal, in descending order, progressively more helpful suggestions to guide the user in proper analysis to solve the answer to the question or problem presented on card 32.

Figure 5:
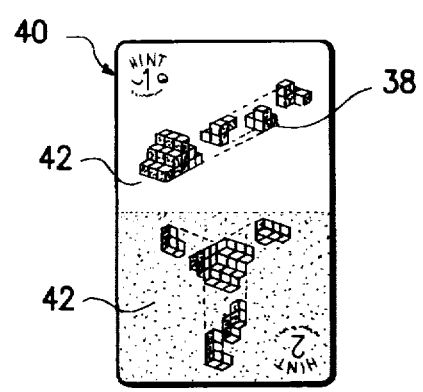
FIG. 5 represents a third embodiment of the invention in the form of bifurcated answers for a spatial puzzle.

FIG. 5 illustrates an embodiment relating to a bifurcated solution 38 arrangement for a spatial puzzle. The spatial puzzle, in this case, comprises an assemblage of seven puzzle pieces that can be arranged in different ways to form different aggregate configurations. The spatial puzzle includes a series of flash-type cards illustrating a target, final configuration. The puzzle is solved by forming the pieces into that shape. This type of spatial puzzle comprises part of the prior art and was commercialized under the name SOMA CUBE.

The present invention distinguishes itself from the SOMA CURE-type puzzle in providing a solution to the shape manipulation puzzle. As depicted in FIG. 5, the shape depicting cards 40, include two distinct/inverted answer segments 42 on the obverse surface. These segments 42 are inverted relative to one another and have different background colors. Each segment incorporates graphical and possible written suggestions for combining the individual pieces in a manner to achieve the target geometry depicted on the card face. For example, the first hint, the one having a white background may depict the relative orientation of three of the seven pieces. The second suggestion may show the positioning of the remaining four pieces. Hence, the user has the option of consulting with either or both of the answer segments, depending on the level of help required or desired.

The invention contemplates using problems and questions encompassing a range of degrees of difficulty. Some problems are of a relatively simple nature and easily answered while others are more difficult. The subject matter of the questions contained on the flashcards can be derived from any number of disciplines; mathematical, visual perceptual, amusement puzzles, literary, artistic, educational, ethical, religious, etc.

The foregoing is representative of physical embodiments of invention. The applications and methodologies of the invention using those physical elements is now described. The following examples demonstrate the need for the user to exercise analytical skills to solve the problem and the benefit of providing incremental answer segments to guide the user to the proper analytical pathway.

The first problem concerns a question about timing. The problem inquires about a person who has two, hour-glass style timers, one timer times for four minutes and the other timer measures time for three minutes. Using just these two timers, can the user successfully and precisely measure a five minute period and, if so, how?

The back of the card contains the answer but is divided into four distinct segments, each containing a progressive hint guiding the analytical thought process of the user to reach the correct answer. If the user is not able to solve the problem without reference to the answer matrix, instead of providing the entire answer outright, the user is given the opportunity to selectively view one or more of the hint containing segments which, preferably, contain progressive suggestions.

The first clue indicates that the user must use both timers coincidentally.

The second hint is that the 3-minute timer must be flipped twice.

The third clue explains the 3-minute timer is turned over the second time when the 4-minute timer ends.

The final segment contains a full explanation of solution: Starting both timers at the same time, quickly flip the 3-minute timer when it first runs out of sand and wait for the 4-minute timer to empty. Because exactly one minute of sand has fallen in the 3-minute timer, flipping the 3-minute timer at the exact moment that the 4-minute timer runs out will measure exactly one more minute.

By allowing the user to select the degree of help from the solution matrix, it avoids an all-or-none effect of providing an entire answer. Therefore, the invention, particularly in an educational or social interaction context, serves to prevent embarrassment and diminished self-esteem from initially failing to solve the problem or puzzle.

Another example of a mathematically oriented puzzle, that associated with the illustration in FIG. 1, concerns weighing. One dozen of five sets of differently colored jars (red, blue, green, yellow, and orange) is slightly overweight, e.g., one ounce. Using a conventional spring scale, how many weighing of the five sets of jars must be made to determine the color of the overweight jar?

The answer is one. The answer is easy but the process of arriving at that answer may not be so obvious. Thus, the invention contemplates assisting the user to arrive at the correct answer by providing a succession of progressively helpful hints. For example, the clues could read: 1) jars of more than one color can be weighed simultaneously; 2) all overweight jars will weigh a number of weight increments (ounces) more than those of other colors; 3) place at least one jar of each color on the scale, and 4) select 15 jars; 5 red, 4 green, 3 blue, 2 yellow, and 1 orange where the ultimate weight (in increments) above 15 units is determined by the number of overweight jars (e.g., 5 if red, 2 if yellow, etc.)

By providing a progressive, incremental answer system, the invention herein allows for continued challenge, learning, and entertainment while providing a degree of self-selection to avoid discouragement. The user determines for himself or herself, the degree of assistance required to arrive at the correct answer. In other words, in some cases, all that is required is a slight hint to urge the user along the correct of several possible solution pathways, where other situations may merit a more substantial solution fragment. In such a case, the user is able to reveal more than one of the plurality of discrete solution segments to progressively reveal the answer. The invention also allows the user to turn the answer wheel to the lower left quadrant 17 or to click on the lower segment 37 to reveal the entire answer immediately and dispense with the graduated answer system. This, however, is the users choice.

Although illustrated using spatial and mathematically oriented problems, the invention can be applied to complex learning problems or any problems requiring an analytical process or critical thinking. For example, a social problem or ethical problem can be presented accompanied by a solution and a multi-step analytical process to reach the solution.

Physical variations of the flashcard format should now be apparent. Instead of the circular answer format of FIG. 2, the card can incorporate an over-and-under answer segment format such as that depicted in the computer screen version of FIG. 4. In such a variation, the housing 20 would require a slidable, pulldown cover as a substitute for the wheel 26 to reveal the answer segments sequentially.

The invention is readily adapted for a range of uses from individual amusement to group and classroom instruction. The invention can be embodied in a traditional printed flashcard or in an electronic setting such as a stand-alone game or computer game. Electronic versions allow for greater flexibility in presentation by providing a multi-media format for both the problems and the answers. Thus, the electronic versions may include music, sound effects, and visual elements. In the case of auditory formats, the invention may be readily adapted for use by the visually impaired.

Flashcard as used herein can be visual, audible tactile or any form of sensory communication. In other words, the "cards" can be in the form of an audible question where the answer is divided into a select number of discrete audible segments adapted for random access. Likewise the "flashcard" can combine different sensory inputs, e.g., visual and audible, relying on conventional computer technology such as a multimedia CD-Rom.

INDUSTRIAL APPLICABILITY

The novel flashcard problem and solution system of this invention is adapted for use in printed or electronic media and providing for staged or progressive hints or steps to the proper solution where the hints are contained in predefined segments connected with the card for providing education, and entertainment for the player(s) and provides a reasonable degree of challenge that is largely self-determined by the use of the segmented solution. The invention provides a unique device and method of play that can be adapted for conventional teaching and or amusement or incorporated into software for stand-alone computer play or interactive play at a plurality of sites.

Given the foregoing, variations and modifications to the invention should now be apparent to a person having ordinary skill in the art. These variations and modifications are intended to fall within the scope and spirit of the invention as defined by the following claims.

What is claimed is:

1. A method of using a flashcard system employing a flashcard providing a question or problem on one face and concealing the answer thereto on the opposite face where the answer or solution is divided into a plurality of discrete answer segments arranged to progressively reveal the correct answer or solution to the problem, the method comprising the steps of:

a) exposing the user with the question contained on the flashcard;

b) providing the user the opportunity to answer the question;

c) allowing the user to select and reveal at least one segment of the plurality of discrete answer segments of the answer to confirm that the user's answer is correct or in error;

d) providing the user with a further opportunity to answer; and e) allowing the user to reveal a select additional portion of the plurality of segments to progressively reveal the answer.

2. The method of claim 1 where there are two segments which are inverted and further comprising the step of overturning the flashcard.

3. A method of using a flashcard system employing flashcard providing a question or problem and concealing the answer thereto on the opposing side where the answer or solution is divided into a plurality of discrete answer segments arranged to progressively reveal the correct answer or solution to the problem, the method comprising the steps of:

a) exposing the user with the question contained on the flashcard;

b) providing the user the opportunity to answer the question;

c) securing the card in a card holder with a rotatable wheel having an opening sized to conform to one of the segments and selectively rotating the wheel to reveal a selected one of said plurality of answer segments;

d) allowing the user to select and reveal at least one segment of the plurality of discrete answer segments of the answer to confirm that the user's answer is correct or in error:

e) providing the user with a further opportunity to answer; and f) allowing the user to reveal a select additional portion of the plurality of segments to progressively reveal the answer.

4. The method of claim 3 further comprising a plurality of removable masking elements dimensionally corresponding to each segment and adapted to be selectively removed to uncover the underlying segment.

5. The method of claim 3 where the flashcard includes four answer segments and further comprising the step of revealing each answer segment in an identifiable sequence.

6. A method of using a flashcard system employing an electronic flashcard providing a question or problem on one face and concealing the answer thereto on a second face where the answer or solution is divided into a plurality of discrete answer segments arranged to progressively reveal the correct answer or solution to the problem, and a plurality of removable masking elements dimensionally corresponding to each segment and adapted to be selectively removed to reveal the segment where the removable masking elements are part of an electronic visual display, the method comprising the steps of:

a) exposing the user with the question contained on the flashcard;

b) providing the user the opportunity to answer the question;

c) allowing the user to select and reveal at least one segment of the plurality of discrete answer segments of the answer to confirm that the user's answer is correct or in error by transmitting an electronic signal to remove the masking element;

d) providing the user with a further opportunity to answer; and e) allowing the user to reveal a select additional portion of the plurality of segments to progressively reveal the answer.

7. A flashcard-type device, comprising:

a) a first indicia containing face, said indicia presenting a solvable problem;

b) a second indicia containing face, said second face being disposed on the opposite side of the flashcard-type device, where the second face is separately viewable from said first face, said second face presenting the solution to the solvable problem, said second face being divided into a plurality of discrete segments each of said segments containing a select portion of the solution to the solvable problem;

c) a selector adapted to reveal a select discrete segment of said second face.

8. A flashcard-type device, comprising:

a) a first indicia containing face, said indicia presenting a solvable problem;

b) a second indicia containing face that is separately viewable from said first face, said second face presenting the solution to the solvable problem, said second face being divided into a plurality of discrete segments each of said segments containing a select portion of the solution to the solvable problem;

c) a selector adapted to reveal a select discrete segment of said second face;

where the flashcard-type device is printed, where there are four discrete segments each comprising a quadrant of a circle, and where the selector comprises a housing having mounted thereon a rotatable wheel including an opening dimensioned to conform to one of said quadrants, wherein rotating the wheel reveals the printed indicia in an underlying quadrant.

9. The flashcard-type device according to claim 8 where said indicia is in printed form and there are two segments on said second face.

10. The flashcard-type device according to claim 9 where said segments contain indicia which is inverted relative to each other.

11. A system for presenting a problem and solution, comprising:

a) means for presenting a solvable problem having a first indicia containing surface and a second indicia containing surface which is different from the first indicia containing surface;

b) means for permitting progressive revelation of the solution to the solvable problem being disposed on the second indicia containing surface of said means for presenting a solvable problem, said means comprising a plurality of discrete segments each containing a selected portion of the solution and each being selectively revealable to disclose a corresponding selected discrete segments solution to the problem.

12. The system of claim 11 where said means for presenting the problem is a printed flashcard.

13. A system for presenting a problem and solution, comprising:

a) electronic display means for presenting a solvable problem having a first indicia containing display and a second indicia containing display which is different from the first indicia containing display;

b) means for permitting progressive revelation of the solution to the solvable problem being disposed on the second indicia containing display of said means for presenting a solvable problem, said means comprising a plurality of discrete segments each containing a selected portion of the solution and each being selectively revealable to disclose a corresponding selected discrete segment solution to the problem.

14. The system of claim 13 where said means for permitting progressive revelation is an electronic mask dimensionally corresponding to the plurality of discrete segments and containing a plurality of removable electronic masks corresponding dimensionally and in number to the discrete segments where the electronic masks are removed by an electronic signal.

15. A system for presenting a problem and solution, comprising:

a) means for presenting a solvable problem;

b) means for permitting progressive revelation of the solution to the solvable problem, said means comprising a plurality of discrete segments each containing a selected portion of the solution and each being selectively revealable to disclose a corresponding selected discrete segments solution to the problem, said means being a printed flashcard;

where said means for permitting progressive revelation is a housing dimensionally corresponding to the flashcard and having a rotatable wheel mounted thereon dimensionally corresponding to the plurality of discrete segments and containing an opening dimensionally corresponding one of said discrete segments.

* * * * *